3,225,043
TRIAZINYL AND PYRIMIDINYL ANTHRA-QUINONE COMPOUNDS
Robert Norman Heslop, Manchester, England, assignor to Imperial Chemical Industries Limited, London, England, a corporation of Great Britain
No Drawing. Filed Dec. 20, 1962, Ser. No. 245,993
Claims priority, application Great Britain, Jan. 11, 1962, 1,056/62
2 Claims. (Cl. 260—249)

This invention relates to new anthraquinone compounds valuable for use as reactive dyes for cellulose textile materials. Hitherto blue reactive anthraquinone dyestuffs which exhibit outstanding brightness of shade have the defect of comparatively poor fastness to washing, or light whilst those which have good fastness to washing are somewhat dull in shade. The present invention provides blue reactive anthraquinone dyestuffs which combine outstanding brightness in shade and good light fastness together with a fastness to washing much superior to that of other known compounds which give the same colour.

According to the invention there are provided the anthraquinone compounds of the formula:

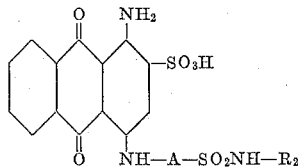

wherein A stands for a benzene radical and $R_2$ stands for a pyrimidine or triazine nucleus containing a labile substituent.

By a labile substituent I mean an atom or group which is bound by a covalent bond to a carbon atom in the 2-, 4- or 6-position of the pyrimidine or triazine nucleus, and which readily dissociates under the influence of heat or alkalis, especially in the presence of moisture, to form an ion or an uncharged molecule.

In the cases where the pyrimidine ring or triazine ring carries only one labile substituent, the said ring may have one or more additional substituents of a non-chromophoric character on the remaining carbon atoms. As examples of such substituents there may be mentioned for example, cyano groups, amino and substituted amino groups such as methylamino, ethylamino, dimethylamino, $\beta$-hydroxyethylamino, di($\beta$-hydroxyethyl)amino, cyclohexylamino, phenylamino, sulphophenyl-amino, disulphophenylamino and carboxyphenylamino; alkoxy groups, especially methoxy, phenoxy, chlorophenoxy and methylphenoxy groups; and phenyl thio groups.

As examples of substituents which may be present in the benzene nucleus A, there may be mentioned, for example, chlorine, methyl and methoxy.

The new anthraquinone compounds can be obtained by reacting together a polyhalogeno-s-triazine or a polyhalogenopyrimidine and a compound of the formula:

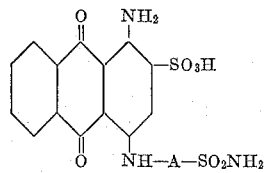

(5)

wherein A stands for a benzene radical and if necessary replacing one or more of any remaining halogen atoms in the triazine or pyrimidine ring with the desired group or groups.

The above process may conveniently be carried out by adding a solution of the polyhalogeno-1,3,5-triazine or polyhalogenopyrimidine for example in acetone, to an aqueous solution of the compound of Formula 5 maintained at a pH of from 7.0 to 11.0 by simultaneously adding a solution of a base for example sodium carbonate or hydroxide. The preferred pH range is 8.5 to 10.5. The temperature of reaction may be between 0° C. and 100° C. dependent on the ease with which the reaction occurs. In general cyanuric chloride or cyanuric bromide reacts within a temperature range of 0 to 10° C. but dihalogeno-1,3,5-triazines and polyhalogeno pyrimidines require a higher temperature of the order of 40 to 80° C.

The compounds of Formula 5 can be obtained by reacting ammonia with chlorosulphonated 1-amino-4-anilino-2-sulpho anthraquinone compounds, for example, by heating anthraquinone compounds of the formula:

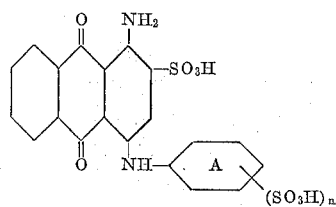

wherein $n$ stands for 1 or 2 and the benzene nucleus A may be further substituted, with chlorosulphonic acid alone or preferably in the presence of an inorganic acid halide such as thionyl chloride phosphorus trichloride or phosphorus oxychloride.

The new anthraquinone compounds of the invention can be used for the colouration of wool, silk and polyamide fibres by application from hot acid, neutral or weakly alkaline dyebath; they are also valuable for use as "reactive" dyestuffs for cotton and other natural or regenerated cellulose material. For colouring such materials the new anthraquinone compounds are preferably applied, either by dyeing or printing, to the materials in conjunction with a treatment with an acid-binding agent, for example sodium hydroxide, sodium carbonate or sodium bicarbonate, which may be applied to the cellulose textile material before, during or after the application of the compound. They have excellent solubility and can build up to give strong shades. The colourations obtained from the new compounds are distinguished by their brightness of shade, and excellent fastness to light and to washing and hypochlorite bleach treatments. The compounds in which the $SO_2NHR_2$ groups are attached to the benzene nuclei A in meta position to the NH group are particularly valuable in view of the reddish-blue shades obtainable from these dyes which have a remarkable combination of brightness of shade and fastness to washing and light.

The invention is illustrated but not limited by the following examples in which parts are by weight.

*Example 1*

A solution of 19.8 parts of the sodium salt of 1-amino-4 - (3'-sulphamylanilino)anthraquinone-2-sulphonic acid in 400 parts of water is stirred and adjusted to pH 11.6 by the addition of 1.6 parts of sodium hydroxide. The solution is cooled to 0° to 5° C. and a solution of 14.8 parts of cyanuric chloride in 100 parts of acetone is added dropwise during about 1 hour. The temperature of the mixture is maintained between 0 and 5° C. and the pH is kept at 10.0 by the addition, as necessary, of 2 N-sodium hydroxide solution during the addition of the acetone solution. The mixture is stirred for a further 10 minutes at 0–5° C. and then filtered; the pH of the filtrates is adjusted to 6.5 and a solution of 6 parts of anhydrous disodium hydrogen phosphate and 12 parts of anhydrous potassium dihydrogen phosphate in 80 parts of water is added. 200 grams of sodium chloride for each litre of solution is then added and the precipitate is filtered, washed with a solution of 40 parts of sodium chloride, 1.5 parts of anhydrous disodium hydrogen phosphate and 3 parts of anhydrous potassium dihydrogen phosphate in 200 parts of water and finally dried at room temperature.

The dyestuff so obtained has the formula:

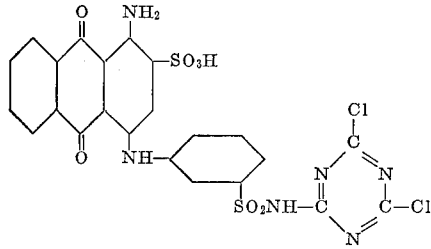

It yields bright blue shades of very good fastness to light and wet treatments, both by dyeing and printing on cellulose.

*Example 2*

A solution of 19.8 parts of the sodium salt of 1-amino-4 - (3'-sulphamylanilino)anthraquinone-2-sulphonic acid in 400 parts of water is stirred and adjusted to pH 11.6 by the addition of 1.6 parts of sodium hydroxide. The solution is cooled to 0–5° C. and a solution of 14.8 parts of cyanuric chloride in 100 parts of acetone is added dropwise during about 1 hour. The temperature of the mixture is maintained at between 0 and 5° C. and the pH is kept at 10.0 by the addition, as necessary, of 2 N sodium hydroxide solution during the addition of the acetone solution. The mixture is then stirred for a further 10 minutes at 0–5° C. then filtered, the pH of the filtrates is adjusted to pH 7.0 and 16 parts of ammonium hydroxide solution of specific gravity 0.880 are added. The mixture is stirred at between 30 and 35° C. for 3 hours and then 200 grams of sodium chloride are added, for each litre of solution. The solid so precipitated is filtered, washed with 20% brine solution and dried at ordinary temperature.

The dyestuff obtained when printed on cotton yields bright blue shades which possess excellent fastness to wet treatments.

*Example 3*

A solution of 19.8 parts of the sodium salt of 1-amino-4 - (3'-sulphamylanilino)anthraquinone-2-sulphonic acid in 120 parts of water is stirred and the pH is adjusted to 11.6 by the addition of 1.6 parts of sodium hydroxide. The solution is cooled to 0° C. to 5° C. and a solution of 14.4 parts of 2:4-dichloro-6-methoxy-s-triazine in 40 parts of acetone is added during 1½ hours; the temperature of the mixture is maintained between 3° C. and 5° C. and the pH is kept at 10.5 to 10.8 by the addition, as necessary, of 2 N-sodium hydroxide solution. The mixture is stirred for a further 5 hours at a temperature of 3° C. to 5° C. and a pH of 10.5 to 10.8, and then filtered. The pH of the filtrate is adjusted to 6.4 and a solution of 1.5 parts of anhydrous potassium dihydrogen phosphate and 0.75 part of anhydrous disodium hydrogen phosphate in 10 parts of water is added for every 100 parts of solution, followed by 30 parts of sodium chloride for every 100 parts of solution. The precipitate is filtered off, washed with a solution of 40 parts of sodium chloride, 3 parts of anhydrous potassium dihydrogen phosphate and 1.5 parts of anhydrous disodium hydrogen phosphate in 200 parts of water and finally dried at room temperature.

*Example 4*

A solution of 19.8 parts of the sodium salt of 1-amino-4 - (3'-sulphamylanilino)anthraquinone-2-sulphonic acid in 120 parts of water is stirred and the pH is adjusted to 11.6 by the addition of 1.6 parts of sodium hydroxide. The solution is cooled to 0° C. to 5° C. and a solution of 14.8 parts of cyanuric chloride in 100 parts of acetone is added dropwise during about 1 hour, the temperature of the mixture being maintained between 0° C. and 5° C. and the pH at 10.0 by the addition, as necessary, of 2 N-sodium hydroxide solution. The mixture is stirred for a further 10 minutes at 0° to 5° C. and pH 10.0, and then filtered. The pH of the filtrate is adjusted to 7.0 and a solution of 6.9 parts of sodium phenate in 30 parts of water is added. The mixture is then stirred at 50° C. for 2 hours, cooled to room temperature and 7.5 parts of sodium chloride are added. The precipitate is filtered off and washed with a solution of 25 parts of sodium chloride in 500 parts of water. The paste is re-dissolved in 1600 parts of water, and filtered. 40 parts of sodium chloride are added to the filtrate and the mixture is stirred for 1 hour. The precipitate is filtered off, washed with a solution of 5 parts of sodium chloride in 200 parts of water, and dried at room temperature.

*Example 5*

A solution of 19.8 parts of the sodium salt of 1-amino-4 - (3'-sulphamylanilino)anthraquinone-2-sulphonic acid in 120 parts of water is stirred and the pH is adjusted to 11.6 by the addition of 1.6 parts of sodium hydroxide. The solution is cooled to 0° C. to 5° C. and a solution of 14.8 parts of cyanuric chloride in 100 parts of water is added during about 1 hour, the temperature of the mixture being maintained between 0° and 5° C. and the pH being kept at 10.0 by the addition, as necessary, of 2 N-sodium hydroxide solution. The mixture is stirred for a further 10 minutes at 0° to 5° C. and pH 10, then filtered and 30 parts of sodium chloride are added to the filtrate. The precipitate is filtered off and washed with a solution of 40 parts of sodium chloride in 200 parts of water. The paste is redissolved in 500 parts of cold water and a solution of 8.58 parts of sodium metanilate in 44 parts of water is added. The mixture is stirred for 3 hours at 33° C. the pH being maintained at 7.0 to 7.3 by the addition of 2 N-sodium carbonate solution. The mixture is then stirred for a further 16 hours at 25° C. and the pH is then adjusted to 7, and 150 parts of sodium chloride added. The precipitate is filtered off, washed with a solution of 60 parts of sodium chloride in 200 parts of water and dried at room temperature.

*Example 6*

A solution of 19.8 parts of the sodium salt of 1-amino-4-(3'-sulphamylanilino)anthraquinone-2-sulphonic acid in 120 parts of water is stirred and the pH is adjusted to 11.6 by the addition of 1.6 parts of sodium hydroxide. The solution is cooled to 0–5° C. and a solution of 14.8 parts of cyanuric chloride in 100 parts of acetone is added dropwise during about 1 hour, the temperature of the mixture being maintained between 0° and 5° C. and the pH being kept at 10.0 by the addition, as necessary, of 2 N-sodium hydroxide solution. The mixture is stirred for a further 10 minutes at 0–5° C., then filtered and 30 parts of sodium chloride are added to the filtrates. The precipitate is filtered off and washed with a solution of 40 parts of sodium chloride in 200 parts of water.

The paste is redissolved in 500 parts of ice-cold water and the pH of the solution is adjusted to 7. A solution of 7.5 parts of sodium-diethyl dithiocarbamate in 60 parts of water is added and the mixture is stirred at 25° C. for 18 hours. The mixture is then heated to 40° C. and stirred for 3 hours, and is then heated to 50° C. and stirred for 2 hours. The mixture is cooled and 116 parts of sodium chloride added and the precipitate is filtered off and washed with a solution of 40 parts of sodium chloride in 200 parts of water. The paste is dissolved in 4000 parts of water and the solution is filtered and 400 parts of sodium chloride are added to the filtrate. The precipitate is filtered off, washed with a solution of 10 parts of sodium chloride in 200 parts of water and dried at room temperature.

Example 7

A solution of 15 parts of the dyestuff of Example 2 in 400 parts of water is stirred at 25° C. and a solution, at 80° C., of 15 parts of nicotinic acid in 300 parts of water is added. The mixture is heated to 80° C. and filtered and the paste is washed with 500 parts of water at 80° C. The product is suspended in 200 parts of water and cooled to 0°–5° C., and sufficient 2 N $Na_2CO_3$ solution is added to raise the pH to 8.0. The solution is filtered and the filtrate is stirred and 60 parts of sodium chloride are added. The precipitate is filtered off and washed with a solution of 30 parts of sodium chloride in 200 parts of water and dried.

In the above example if the 15 parts of nicotinic acid are replaced by 30 parts of pyridine, a dyestuff of lower solubility but otherwise similar properties is obtained.

Example 8

A solution of 19.8 parts of the sodium salt of 1-amino-4-(3'-sulphamylanilino)anthraquinone-2-sulphonic acid in 150 parts of water is stirred and the pH is adjusted to 11.6 by the addition of 1.6 parts of sodium hydroxide. The solution is stirred at 30° C. and a solution of 17.4 parts of 2:4:5:6-tetrachloro-pyrimidine in 80 parts of dioxan is added during 15 minutes. The temperature of the mixture is maintained at 30° C. and the pH is kept at 10 to 10.5 by the addition, as necessary, of 2 N-sodium hydroxide solution. The mixture is stirred at 30° C. and at pH 10 to 10.5 for a further 2 hours and then at 45° C. to 50° C. for 4 hours, the pH again being maintained at 10.0 to 10.5. The solution is then cooled to 25° C. and 30 parts of sodium chloride are added then the precipitate is filtered off and washed with a solution of 40 parts of sodium chloride in 200 parts of water. The paste is then dissolved in 500 parts of water and filtered. The pH of the filtrate is adjusted to 7.0, 25 parts of sodium chloride are added and the precipitate is filtered off, washed with a solution of 25 parts of sodium chloride in 500 parts of water and dried at room temperature.

If the 2,4,5,6-tetrachloropyrimidine used in the above example is replaced by 14.7 parts of 2,4,6-trichloropyrimidine, a similar product is obtained.

Example 9

A solution of 19.8 parts of the sodium salt of 1-amino-4-(3'-sulphamylanilino)anthraquinone-2-sulphonic acid in 120 parts of water is stirred and the pH is adjusted to 11.6 by the addition of 1.6 parts of sodium hydroxide. The solution is cooled to 0°–5° C. and a solution of 15.7 parts of 5-cyano-2:4:6-trichloropyrimidine in 50 parts of acetone is added during 15 minutes, the temperature being maintained at 0°–5° C. and the pH at 10 to 10.5 by the addition of 2 N-sodium hydroxide solution as necessary. The mixture is stirred for a further 4 hours under these conditions and then filtered. The pH of the filtrate is adjusted to 7.0 and 15 parts of sodium chloride are added. The precipitate is filtered off, washed with a solution of 15 parts of sodium chloride in 100 parts of water and dried at room temperature.

Example 10

In Example 1 if the 19.8 parts of the sodium salt of 1-amino-4-(3'-sulphamylanilino)anthraquinone-2-sulphonic acid are replaced by 19.8 parts of the sodium salt of 1-amino-4-(2'-sulphamylanilino)anthraquinone-2-sulphonic acid, a dyestuff of similar shade and properties is obtained.

Example 11

If in Example 1, the 19.8 parts of the sodium salt of 1-amino-4-(3'-sulphamylanilino)anthraquinone-2-sulphonic acid are replaced by 19.8 parts of the sodium salt of 1-amino-4-(4'-sulphamylanilino)anthraquinone-2-sulphonic acid, a similar dyestuff is obtained.

Example 12

A solution of 21.2 parts of the sodium salt of 1-amino-4-(4'-chloro-3'-sulphamylanilino)anthraquinone-2-sulphonic acid in 220 parts of water is stirred and the pH is adjusted to 11.6 by the addition of 1.6 parts of sodium hydroxide. The solution is cooled to 0° to 5° C. and a solution of 14.8 parts of cyanuric chloride in 100 parts of acetone is added during about 15 minutes, the temperature of the mixture being maintained between 0° and 5° C. and the pH at 10.0 by the addition, as necessary, of 2 N-sodium hydroxide solution. The mixture is stirred for a further 30 minutes at 0°–5° C. and pH 10.0 to 10.3 and then filtered. The filtrate is stirred and a solution of 8.8 parts of anhydrous disodium hydrogen phosphate and 17.6 parts of anhydrous potassium dihydrogen phosphate in 80 parts of water is added followed by 55 parts of sodium chloride. The precipitate is filtered off, washed with a solution of 13.2 parts of anhydrous potassium dihydrogen phosphate and 6.6 parts of anhydrous disodium hydrogen phosphate and 40 parts of sodium chloride in 200 parts of water, and dried at room temperature.

Example 13

A solution of 21.0 parts of the sodium salt of 1-amino-4-(4'-methoxy-2'-sulphamylanilino)anthraquinone-2-sulphonic acid in 210 parts of water is stirred and the pH is adjusted to 11.6 by the addition of 1.6 parts of sodium hydroxide. The solution is cooled to 0° to 5° C. and a solution of 14.8 parts of cyanuric chloride in 100 parts of acetone is added during 30 minutes, the temperature of the mixture being maintained between 0° and 5° C. and the pH being kept at 10.0 to 10.3 by the addition, as necessary, of 2 N-sodium hydroxide solution. The mixture is stirred for a further 15 minutes and then filtered. The filtrate is stirred, the pH is adjusted to 6.4 and a solution of 17.6 parts of anhydrous disodium hydrogen phosphate and 35.2 parts of anhydrous potassium dihydrogen phosphate in 132 parts of water is added followed by 80 parts of sodium chloride. The precipitate is filtered off, washed with a solution of 13.2 parts of anhydrous potassium dihydrogen phosphate and 6.6 parts of anhydrous disodium hydrogen phosphate and 30 parts of sodium chloride in 200 parts of water, and dried at room temperature. The dyestuff is similar in properties to that of Example 1 but is greener in shade.

Example 14

0.24 part of caustic soda are added to a solution of 5.1 parts of the sodium salt of 1-amino-4-(3'-sulphamyl-2'-methylanilino)anthraquinone-2-sulphonic acid in a mixture of 100 parts of water, 16 parts of acetone and 30 parts of dioxane and the solution is cooled to 10° C. The mixture is stirred and a solution of 3.6 parts of 2,4-dichloro-6-methoxy-s-triazine in 16 parts of acetone is added during 1½ hours, the temperature being maintained at 10° C. and the pH at 10.5 during the addition and for a further 1 hour. A solution of 2.0 parts of 2,4-dichloro-6-methoxy-s-triazine in 16 parts of acetone is then added during 1 hour under the same conditions as above and after stirring for a further hour, the reaction mixture is filtered and sodium chloride equivalent to 150 grams per litre is added to the filtrate. The precipitate is filtered off, washed with 4% brine and dried at room temperature.

Example 15

0.57 part of caustic soda are added to a stirred solution of 8.2 parts of the sodium salt of 1-amino-4-(3':5'-bis-sulphamylanilino)anthraquinone-2-sulphonic acid in 75 parts of water and the mixture is cooled to 0° C. A solution of 5.3 parts of cyanuric chloride in 28 parts of acetone is added during 1 hour, the temperature being maintained at 0° to 3° C. and the pH of the mixture at 10.0 to 10.5 during the addition. After stirring for a further 35 minutes under the above conditions, the pH is allowed to fall to 7.5 and the mixture is filtered. The pH of the filtrates is adjusted to 6.8, a solution of 3 parts of anhydrous disodium hydrogen phosphate and 6 parts of anhydrous potassium dihydrogen phosphate in 35 parts of water is added and then sodium chloride, equivalent to 300 grams per litre is added. The precipitate is filtered off, washed with a solution of 64 parts of sodium chloride, 3 parts of anhydrous disodium hydrogen phosphate and 6 parts of anhydrous potassium dihydrogen phosphate in 230 parts of water and dried at room temperature.

The product so obtained has the formula:

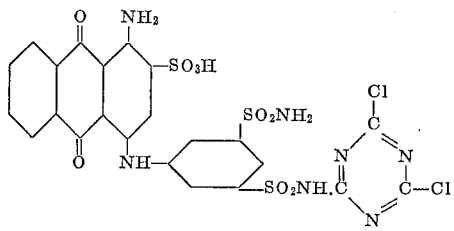

I claim:
1. An anthraquinone compound of the formula:

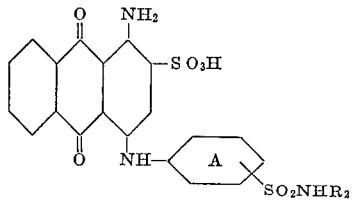

wherein any further substituent on the benzene nucleus A is selected from the class consisting of methyl, methoxy, chlorine and sulphamyl, and $R_2$ stands for a radical of the class consisting of (a) 6-chloro-, 5,6-dichloro- and 5-cyano-6-chloropyrimidinyl, attached to the nitrogen atom by one of the carbon atoms in the 2 and 4 positions of the pyrimidine nucleus and carrying a chlorine substituent attached to the other of said atoms;

(b) 4-amino-2-triazinyl carrying a substituent selected from the class consisting of pyridinium-l-yl and carboxypyridinium-l-yl radicals in the 6-position of the triazine nucleus, and (c) 4-chloro-2-triazinyl carrying a substituent selected from the class consisting of chlorine, lower alkoxy, benzenoxy, sulfoanilino, N,N-di(lower alkyl)thiocarbamylthio and amino in the 6-position of the triazine nucleus.

2. The anthraquinone compound of the formula:

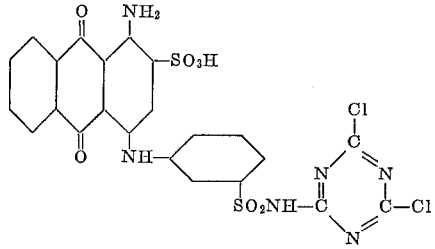

References Cited by the Examiner
UNITED STATES PATENTS

| | | | |
|---|---|---|---|
| 1,987,538 | 1/1935 | Peter | 260—374 |
| 2,029,258 | 1/1936 | Diefenbach | 260—374 |
| 2,892,670 | 6/1959 | Alsberg et al. | 260—249 X |
| 3,029,123 | 4/1962 | Putter et al. | 260—249 X |

WALTER A. MODANCE, *Primary Examiner.*
DUVAL T. McCUTCHEN, *Examiner.*